(12) United States Patent
Inoue et al.

(10) Patent No.: US 6,264,911 B1
(45) Date of Patent: Jul. 24, 2001

(54) PRODUCTION METHOD OF IRON CARBIDE

(75) Inventors: Eiji Inoue; Torakatsu Miyashita, both of Kobe; Yoshio Uchiyama, Akashi; Junya Nakatani, Kobe; Teruyuki Nakazawa, Koganei; Akio Nio, Kiyose, all of (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 09/368,000

(22) PCT Filed: Feb. 25, 1998

(86) PCT No.: PCT/JP98/00790

§ 371 Date: Aug. 24, 1999

§ 102(e) Date: Aug. 24, 1999

(87) PCT Pub. No.: WO98/38128

PCT Pub. Date: Sep. 3, 1998

(30) Foreign Application Priority Data

Feb. 28, 1997 (JP) .................................................... 9-45625

(51) Int. Cl.⁷ .................................................. C01B 31/30
(52) U.S. Cl. ............................................................ 423/439
(58) Field of Search ....................................... 423/439, 138

(56) References Cited

U.S. PATENT DOCUMENTS 5,837,031 * 11/1998 Miyashita et al. ...................... 75/505

OTHER PUBLICATIONS

International Preliminary Examination and Translation, Dec. 25, 1998.
Request for International Application (in Japanese), No date.
International Search Report (in Japanese), Jun. 2, 1998.
WIPO's Publication with Search Report with Copies of Untranslated Prior Art (2 ref), Sep. 3, 1998.
Written Opinion Issued on Jul. 14, 1998 (in Japanese).
Response Filed in Reply to the Written Opinion with the Amendment (in Japanese), No date.
Preliminary Examination Report (in Japanese), Jan. 12, 1999.
Notification of Receipt of Record Copy from the PCT, Mar. 17, 1998.

* cited by examiner

Primary Examiner—Steven P. Griffin
Assistant Examiner—Eileen E. Nave

(57) ABSTRACT

Disclosed is a method for producing iron carbide, in which metallic carbide is difficult to be formed on the inside of heating tubes of a tube-shaped heater for heating reducing gas and carburizing gas to be supplied to a reactor. Carburizing gas which is supplied to reactor 1 is heated in tube-shaped heater 6 by combustion gas used for heating reducing gas and circulating gas, and then a mixture comprising carburizing gas, reducing gas and circulating gas is supplied to reactor 1. Iron-containing raw materials are reduced and carburized in reactor 1.

2 Claims, 3 Drawing Sheets

PRODUCTION METHOD OF IRON CARBIDE

DESCRIPTION

1. Technical Field

The present invention relates to a method for producing iron carbide suitable for raw materials for iron making and steel making which comprises iron crabide ($Fe_3C$) as a main component, for example, raw materials for steel making which is used in an electric furnace and the like.

2. Background Art

The production of steel normally comprises the steps of converting iron ore into pig iron using a blast furnace, and then converting the pig iron into steel using an open hearth furnace or a convertor. Such a traditional method requires large amounts of energy and large-scale equipment, and has a high cost. Therefore, for a small-scale steel making, a method comprising the steps of directly converting iron ore into raw materials to be used in a steel-making furnace, and converting the raw materials into steel using an electric furnace and the like has been used. With respect to this direct steel making process, a direct reduction process has been used to convert iron ore into reduced iron. However, the reduced iron produced by the direct reduction process is highly reactive and reacts with oxygen in the air to generate heat. Therefore, it is necessary to seal the reduced iron with an inert gas or by some other measures during transportation and storage of the reduced iron. Accordingly, iron carbide ($Fe_3C$) containing a comparatively high iron (Fe) content, and which has a low reaction activity and can be easily transported and stored, has recently been used as the raw materials for steel making in an electric furnace and the like.

Furthermore, raw materials for iron making or steel making containing iron carbide as a main component is not only easy to be transported and stored, but also has the advantage that carbon element combined with iron element can be used as a source of fuel in an iron making or steel making furnace, and can be used as a source to generate microbubbles which accelerates a reaction in the steel making furnace. Therefore, raw materials for iron making or steel making containing iron carbide as a main component have recently attracted special interest.

According to a conventional method for producing iron carbide, iron ore fines are fed into a fluidized bed reactor or the like, and are caused to react with a gas mixture comprising a reducing gas (e. g., hydrogen gas) and a carburizing gas (e. g., methane gas and the like) at a predetermined temperature. Thus, iron oxides (e.g., hematite ($Fe_2O_3$), magnetite ($Fe_3O_4$), wustite (FeO)) contained in iron ore are reduced and carburized in a single process (which means a process performed by simultaneously introducing a reducing gas and a carburizing gas to a single reator). This reaction is performed by the following overall reaction formula (1).

$$3Fe_2O_3+5H_2+2CH_4 \rightarrow 2Fe_3C+9H_2O \tag{1}$$

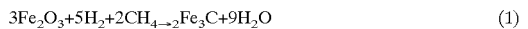

The prior art related to the field of the present invention has been described, for example, in the publication No. 6-501983 of Japanese translation of International Application (PCT/US91/05198).

In order to easily understand the present invention, an example of an apparatus for producing iron carbide according to the prior art will be described below. For example, an apparatus shown in FIG. 3 has been known. With reference to FIG. 3, the reference number 1 denotes a reactor. Iron-containing raw materials are fed into reactor 1 through feeding port 2 and iron carbide is discharged from exhaust port 3. The reference number 4, 5 and 6 indicate a dehumidifier, a compressor, a tube-shaped heater respectively. Reactor 1, dehumidifier 4, compressor 5, and heater 6 form a circulating loop 7. The reference number 8 is a line for supplying natural gas containing methane as a main component. Line 8 diverges into line 9 and line 10, and line 9 is connected to circulating loop 7 in the rear of compressor 5. Line 10 is connected to circulating loop 7 via steam reformer 11, shift-converter 12, and decarbonator 13. An example of method for producing iron carbide using the above apparatus will be described below.

When iron-containing raw materials for iron making are fed into reactor 1 through feeding port 2, iron-containing raw materials are reduced and carburized in reactor 1 to be converted into iron carbide in accordance with the above reaction formula (1). In this reaction, since hydrogen is consumed to perform a reducing reaction and methane is consumed to perform a carburizing reaction, it is necessary to supply reactor 1 with reducing gas component and carburizing gas component. So, natural gas containing methane as the main component is supplied as carburizing gas component to circulating loop 7 through line 9.

Natural gas flowing through line 10 is steam-reformed according to the following reaction formula (2) at steam reformer 11.

$$CH_4+H_2O \rightarrow 3H_2+CO_2 \tag{2}$$

Carbon monoxide contained in steam-reformed gas is converted into hydrogen and carbon dioxide at shift converter 12 in accordance with the following reaction formula (3)

$$CO+H_2O H_2+CO_2 \tag{3}$$

Carbon dioxide obtained by the reaction at shift converter 12 is eliminated from the gas at decarbonator 13. Thus, hydrogen is supplied from line 10 to circulating loop 7.

As described above, hydrogen and methane supplied to circulating loop 7 are heated at tube-shaped heater 6 to a temperature of 650~700° C. with circulation gas circulating through loop 7. But, if gas containing hydrogen and methane is heated to such a high temperature, hydrocarbon ($C_nH_m$) comprising methane as the main component is thermal-decomposed and active carbon is generated according to the following reaction formula (4). As shown in the following reaction formula (5), this active carbon is reacted with metallic component (M), such as Nickel and the like, which is material for heating tube to be a constituent component of heater. As a result, metallic carbide ($M_xC$) is formed.

$$C_nH_m \rightarrow nC+(m/2)H_2 \tag{4}$$

$$C+_xM \rightarrow M_xC \tag{5}$$

FIG. 5 shows a cementation speed of 20Cr—12Ni steel as an example of cementation of metal under the conditions of temperature of 750° C., pressure of 4~6 atm., and reaction gas comprising a mixture of $CH_4$, CO, $CO_2$, $H_2$ and $H_2O$. In FIG. 5, line A of the graph denotes the case in which $CH_4$ accounts for 60 volume percent in the mixture of the above gases, and line B of the graph denotes the case in which $CH_4$ accounts for 65 volume percent in the mixture of the above gases. As shown in FIG. 5, a cementation speed is in the range from about 2.1 to 6.0 mg/cm².60 hr.

However, if the formation of metallic carbide becomes a supersaturated condition, carbon is separated from metallic carbide as shown in the following reaction formula (6). At this time, the metallic component on the inside of heating tube 14 shown in FIG. 4 exfoliates and it is possible that phenomena such as the decrease in thickness of heating tube or pitting will occur.

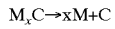  (6)

In consideration of the above-mentioned problems of the prior art, it is an object of the present invention to provide a method for producing iron carbide in which metallic carbide is difficult to be formed on the inside of heating tube of a tube-shaped heater which heats reducing gas and carburizing gas for supplying to a reactor.

DISCLOSURE OF INVENTION

In order to accomplish the above-mentioned object, the present invention is characterized by that carburizing gas is heated separately from reducing gas or circulating gas and heated to lower temperature than reducing gas or circulating gas. As a result, in accordance with the present invention, it is possible to control the formation of active carbon in a tube-shaped heater and decrease exfoliation of metallic component of heating tube due to separation of carbon.

A first aspect of the present invention is directed to a method for producing iron carbide comprising the steps of heating hydrocarbon gas, hydrogen gas, which have been supplied from the outside, and a circulating gas at a tube-shaped heater, and then supplying the said gases to a reactor in order to convert iron ore into iron carbide, wherein the only hydrocarbon gas is heated to lower temperature than thermal decomposition temperature of the hydrocarbon gas at a separate heating tube from heating tubes for the other reaction gases, and then mixed with the heated hydrogen gas and circulating gas in order to supply to the reactor without further heating.

A second aspect of the present invention is directed to a method for producing iron carbide comprising the step of supplying hydrocarbon gas, hydrogen gas, which have been supplied from the outside, and a circulating gas to a reactor in order to convert iron ore into iron carbide, wherein the hydrocarbon gas is mixed with the other reaction gases, which have been heated at a tube-shaped heater, in order to supply to the reactor.

A third aspect of the present invention is directed to a method for producing iron carbide comprising the steps of heating hydrocarbon gas, hydrogen gas, which have been supplied from the outside, and a circulating gas at a tube-shaped heater, and then supplying the said gases to a reactor in order to convert iron ore into iron carbide, wherein a mixture of the hydrocarbon gas and part of circulating gas is heated to lower temperature than thermal decomposition temperature of the hydrocarbon gas at a separate heating tube from heating tubes for the other reaction gases and then mixed with the heated hydrogen gas and circulating gas in order to supply to the reactor without further heating.

It is preferable that the temperature of the hydrocarbon gas, which have been supplied from the outside, at inside wall of the heating tube is lower than thermal decomposition temperature of the hydrocarbon gas, and more preferably the said temperature is in the temperature range from 350 to 650° C.

In accordance with the present invention, iron-containing raw materials for iron making are fed to a reactor. The iron-containing raw materials are reduced and carburized by reducing gas (hydrogen gas) and carburizing gas (hydrocarbon gas), which have been heated up to a predetermined temperature in a heater and supplied to the reactor, to be converted into iron carbide ($Fe_3C$). And then the iron carbide is discharged from an exhaust port of the reactor. The gas after reaction in the reactor is circulated through a circulating loop. Since the certain quantity of reducing gas and carburizing gas is consumed in this reaction, a predetermined quantity of reducing gas component and carburizing gas component is supplied to this reaction system. However, if carburizing gas is heated to a high temperature, active carbon is generated owing to thermal decomposition of hydrocarbon contained in carburizing gas. The above active carbon is reacted with metallic component which is material for heating tube to be a constituent component of heater to form metallic carbide. If the formation of metallic carbide becomes a supersaturated condition, carbon is separated from metallic carbide. At this time, the metallic component of heating tube may exfoliate.

But, in accordance with the present invention, since carburizing gas ( or a mixture of the hydrocarbon gas and part of circulating gas) is heated separately from circulating gas or reducing gas, it is possible to form no metallic carbide on the heating tube without thermal decomposition of carburizing gas during heating the carburizing gas. Especially, if the heating temperature of carburizing gas is in the temperature range from 350 to 650° C., the formation of metallic carbide becomes less than that made under the other temperatures. Accordingly, it is possible to extend a life of heating tube.

In accordance with the present invention, since metallic carbide is controlled to be formed on the inside of tube-shaped heaters which heat reducing gas and carburizing gas to be supplied to a reactor, the metallic component of heating tube does not exfoliate and it is possible to extend a life of heating tube.

BEST MODE FOR CARRYING OUT THE INVENTION

Figure 1:
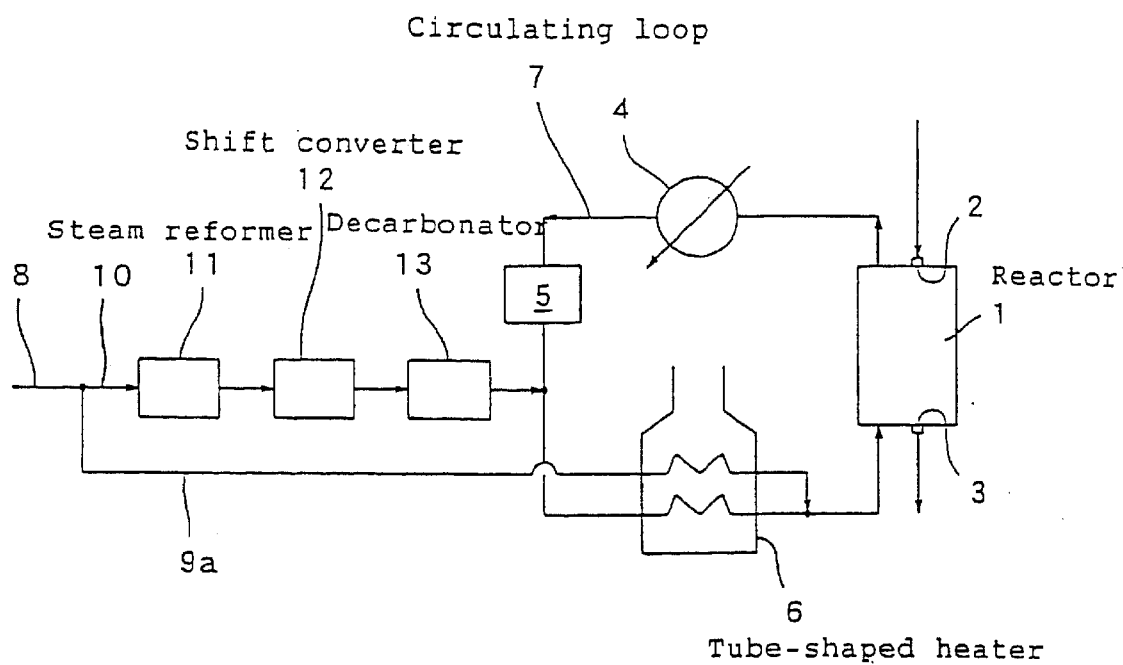
FIG. 1 is a schematic diagram showing a preferred example of an apparatus suitable for performing the method for producing iron carbide according to the present invention.
Figure 2:
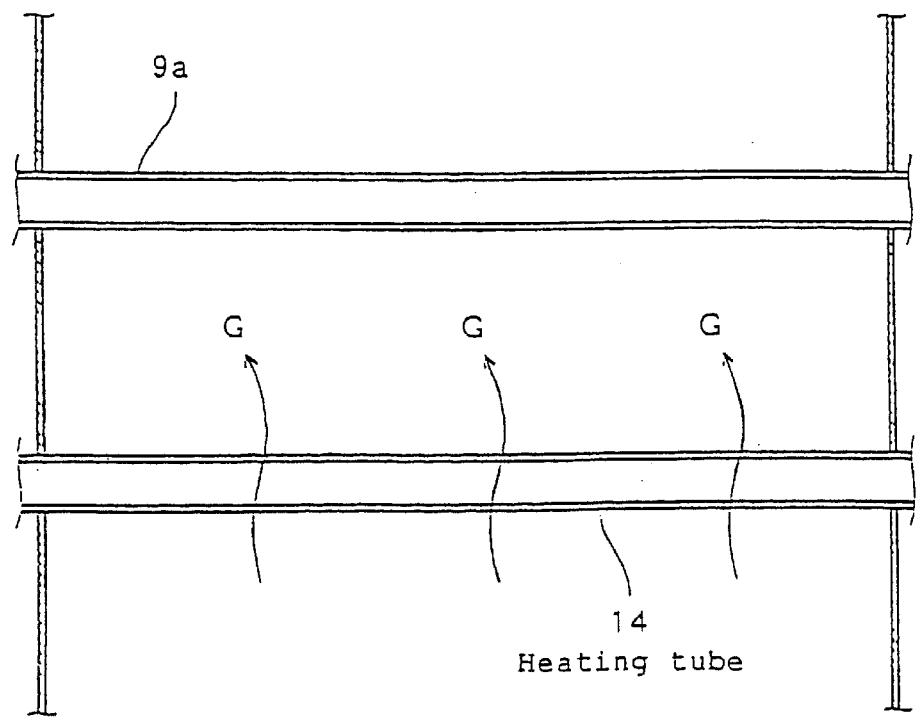
FIG. 2 is a partly enlarged view of tube-shaped heater shown in FIG. 1.
Figure 3:
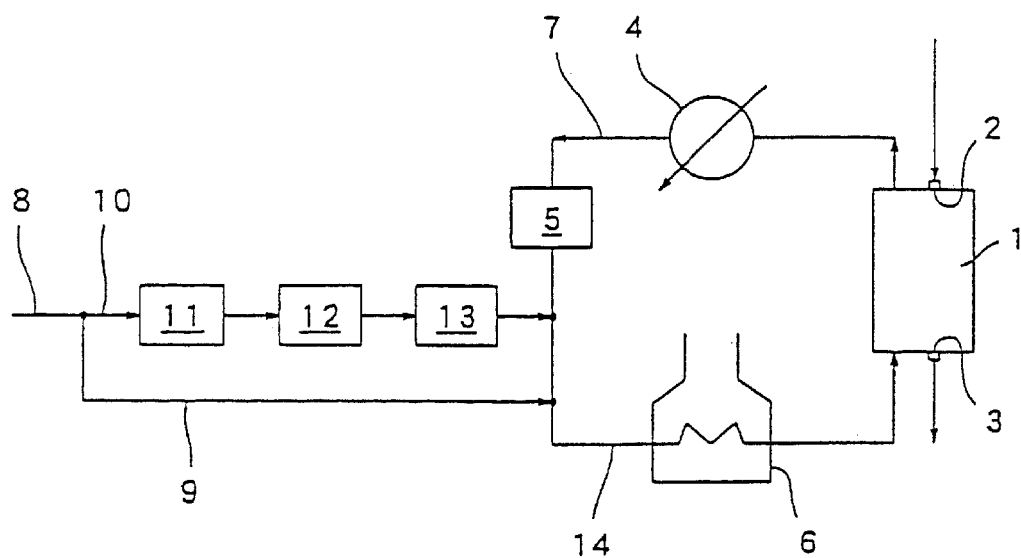
FIG. 3 is a schematic diagram showing an example of an apparatus for producing iron carbide according to the prior art.
Figure 4:
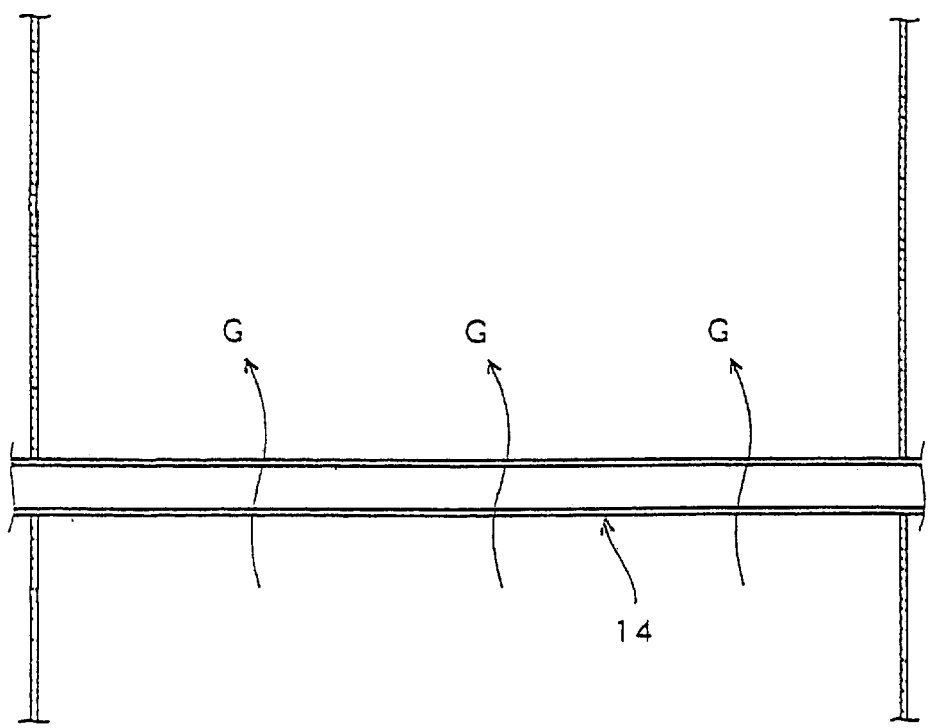
FIG. 4 is a partly enlarged view of tube-shaped heater shown in FIG. 3.
Figure 5:
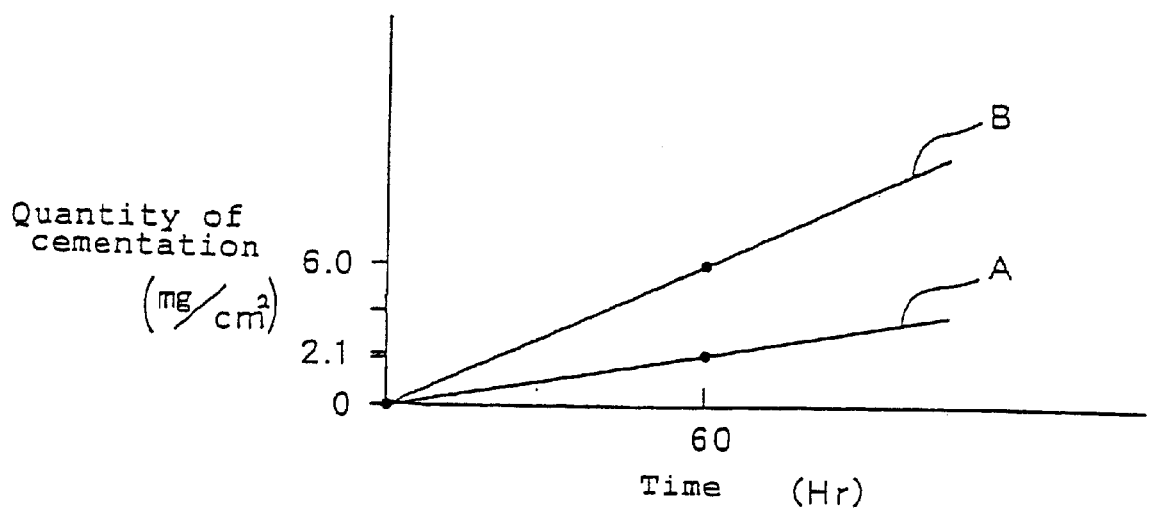
FIG. 5 is an example of cementation speed of metal.

Hereinafter, a preferred embodiment of the present invention will be described. FIG. 1 is a schematic diagram showing a preferred example of apparatus suitable for performing the method for producing iron carbide according to the present invention. FIG. 1 shares with the same reference number as shown in FIG. 3. FIG. 1 is different from FIG. 3 in that line 9a diverged from line 8 for supplying natural gas is connected to the rear of tube-shaped heater 6. That is to say, as shown in FIG. 2, natural gas flowing through line 9a is heated at a separate heating tube in heater 6 from heating tube 14 through which circulating gas and reducing gas flow. As described above, since line 9a is heated by combustion gas (G) used for heating heating tube 14, a temperature of line 9a is kept in the range of a temperature of 350~650° C. As a result, natural gas flowing through line 9a is difficult to cause thermal decomposition, thereby controlling the generation of active carbon. Accordingly, generation of metallic carbide owing to cementation of the insides of line 9a and heating tube 14 is controlled, and the metallic component of line 9a and heating tube 14 does not exfoliate.

Furthermore, in FIG. 1, it is possible to mix part of circulating gas with natural gas flowing through line 9a and heat line 9a by combustion gas (G) used for heating heating tube 14, as described above.

Also, in FIG. 1, it is possible to make line 9a bypass heater 6 without going through tube-shaped heater 6 (no heating of gas contained in line 9a at heater 6) and connect line 9a to the rear of heater 6.

INDUSTRIAL APPLICABILITY

Since the present invention has the above-mentioned constitution, the apparatus in accordance with the present invention is suitable to an apparatus for producing iron carbide, in which metallic carbide is difficult to be formed on the inside of heating tube of tube-shaped heater for heating reducing gas and carburizing gas to be supplied to a reactor.

What is claimed is:

1. A method for avoiding metallic carbide formation on the inside of a heating tube of a tube-shaped heater applied to iron carbide producing process comprising the steps of heating hydrocarbon gas, hydrogen gas, which has been supplied from the outside, and circulating gas in the tube-shaped heater, and then transporting the gasses to a reactor in order to convert iron ore into iron carbide, wherein the hydrocarbon gas is heated to a lower temperature than the thermal decomposition temperature of the hydrocarbon gas in a separate heating tube from the heating tubes for the hydrogen and circulating gases, mixed with the heated hydrogen gas and circulating gas and transported to the reactor without further heating.

2. A method for avoiding metallic carbide formation on the inside of a heating tube of a tube-shaped heater applied to iron carbide producing process comprising the steps of heating hydrocarbon gas, hydrogen gas, which has been supplied from the outside, and circulating gas in the tube-shaped heater, and then transporting the gases to a reactor to convert iron ore into iron carbide, wherein a mixture of the hydrocarbon gas and part of the circulating gas is heated to a lower temperature than the thermal decomposition temperature of the hydrocarbon gas in a separate heating tube from the heating tubes for the hydrogen and circulating gases, mixed with the heated hydrogen gas and circulating gas and transported to the reactor without further heating.

\* \* \* \* \*